United States Patent [19]
Demisch

[11] 4,184,947
[45] Jan. 22, 1980

[54] TREATMENT OF SEWAGE EFFLUENT

[76] Inventor: Ronald R. Demisch, 4 Tarlton Rd., Toronto, Ontario, Canada

[21] Appl. No.: 820,888

[22] Filed: Aug. 1, 1977

[51] Int. Cl.$^2$ ............................................. C02C 1/02
[52] U.S. Cl. .................................. 210/18; 210/38 A; 210/64; 210/DIG. 29
[58] Field of Search .................. 210/18, 38 A, 64, 24, 210/532 S, DIG. 29, 290

[56] References Cited
U.S. PATENT DOCUMENTS

| | | | |
|---|---|---|---|
| 3,382,983 | 5/1968 | Stewart | 210/290 X |
| 3,983,033 | 9/1976 | Latour | 210/DIG. 29 |
| 4,021,338 | 5/1977 | Harkins | 210/18 X |

*Primary Examiner*—John Adee

[57] ABSTRACT

Effluent from a sewage treatment system, such as a septic tank, a settling chamber, or a settling pond is distributed in or over a leaching bed and is percolated in the presence of entrained air through a filter bed that includes a layer of soil with chemical additives having phosphate removal ability adhering thereto in wash-out resisting relation for the purposes of treating the effluent to remove phosphate therefrom and promote the breakdown of bacteria therein.

5 Claims, 5 Drawing Figures

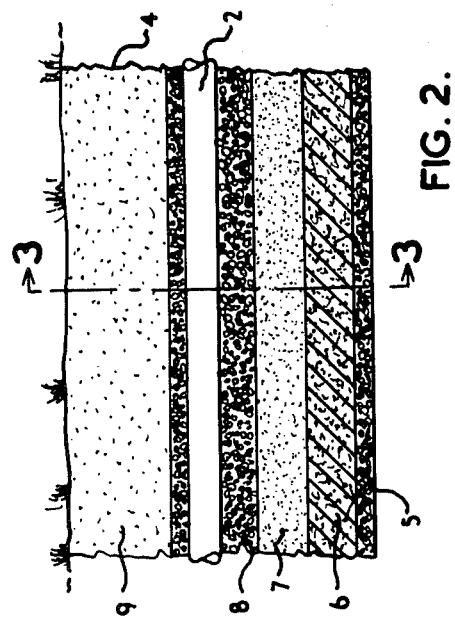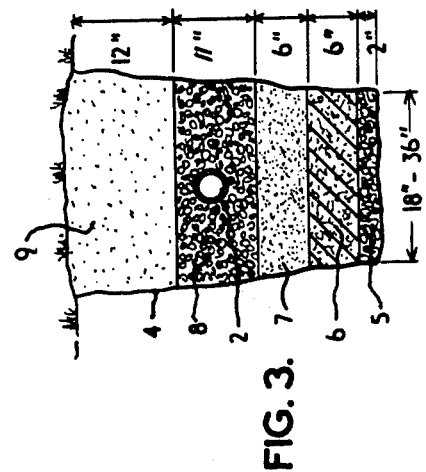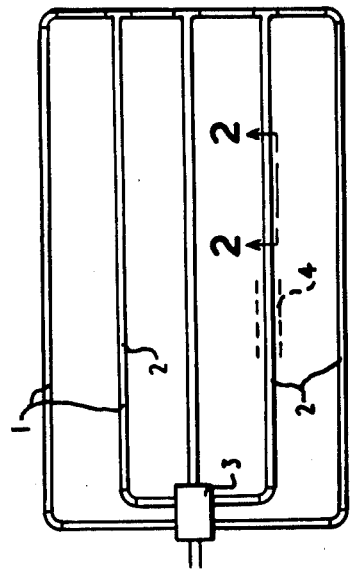

TREATMENT OF SEWAGE EFFLUENT

BACKGROUND OF THE INVENTION

The invention relates to improvements in treatment of sewage effluent to raise the quality of waste water produced in sewage disposal systems, e.g., septic tanks, aerobic treatment or settling pond systems. It appertains particularly to the removal of phosphates by a filter bed which receives untreated or partially treated sewage from a system operating aerobically or anaerobically for stabilization of the waste.

In today's concern for the protection of human health and the natural environment, populous areas are generally equipped with sewage treatment facilities of some kind to destroy dangerous bacteria or viruses and remove unwanted contamination and nutrients that would pollute the surface or ground water.

In parts of the country not served by a municipal sewage treatment plant, in farmland and recreational areas, the septic tank system is considered satisfactory so that its use continues to increase. In the conventional septic tank system, it is normal practice to lay the drainage pipes or tiles for distribution of sewage in a trench, twenty-four to thirty-six inches deep and about eighteen to thirty-six inches wide with the total length of the distribution system determined by the volume of the daily sewage discharge and the absorptive capacity of the soil.

In septic tank sewage treatment systems, the leaching bed should have a depth of at least 40 inches of soil below the drainage pipe or tiles and the underground water, bedrock or any impervious strata should be at least five feet below ground surface. Where the leaching bed cannot operate effectively due to the water table being high, soil characteristics for the absorption poor, or soil cover over rocks is thin, sewage effluent in only insufficiently treated condition reaches the water table to contaminate it with pathogens, undesirable pollutants and nutrients such as phosphates, ammonia, etc.

In areas where conventional subsurface waste disposal systems cannot be installed due to the aforementioned reasons, alternate and better methods for the treatment of sewage are required. Accordingly, it is an object of this invention to provide an improved method of treating sewage to remove the noxious pollutants such as organic matter, contaminants containing nutrients such as phosphates nitrogen, pathogens, viruses, etc., in a leaching bed provided with chemical additives.

A further object of the invention is to provide a filter layer for a sewage leaching bed in which the filter includes a layer of soil with chemical additives that resist being washed out by adhering to the soil by physio-chemical bonds.

To the accomplishment of these and related objects, the invention resides in the sewage treatment method and the filter or leaching bed construction hereinafter more fully described, illustrated in the accompanying drawings and pointed out in the claims hereunto appended.

BRIEF DESCRIPTION OF THE DRAWINGS

FIG. 1 is a schematic plan view of a conventional type leaching bed, for on site subsurface disposal of sewage, embodying the present invention;

FIG. 2 is an enlarged, vertical longitudinal section of an absorption trench thereof as seen along line 2—2 of FIG. 1;

FIG. 3 is a transverse section of the trench, on line 3—3 of FIG. 2;

DETAILED DESCRIPTION OF THE INVENTION

By diligent study and research a type of sewage filter and leaching bed with enhanced efficiency has been developed by adding to the bed of aggregate that underlies the distribution system a layer of treated aggregate such as soil admixed with certain chemical additives including hydrous multivalent metallic oxides, zeolite, etc., about to form tetrahedral structures, chemical and bacterial action are caused as the effluent percolates therethrough together with entrained air that (a) extracts the phosphate ions and (b) reduces biological oxygen demand and coliform bacteria count by accelerated oxidation.

In passing sewage through soil of different physical characteristics in leaching beds now in use, one of the deficiencies in the treatment process is the inadequate removal of phosphates. It has been found that by admixing chemical additives in the form of hydrous oxides or calcium, aluminum, iron etc., to the filter media significant phosphate removal from the waste is obtained. Potential phosphate removers include red mud, laterite, bauxite and bog iron ore.

Selecting red mud as a desirable phosphate ion extracting agent, having a capacity for almost complete phosphate removal, it has been found that its sodalite structure renders it suitable for ion exchanging which may account in part for its high phosphate ion extracting potency. This red mud which is recovered as a waste product of aluminum smelting operations contains a mixture of hydrous oxides of different metals such as $Fe_2O_3$, $Al_2O_3$, $SiO_2$, $Na_2O$, $CaO$. The red mud sludge is admixed with soil in different proportions. Because of its very small particle size, the red mud becomes fixed as a very thin coating on the reactive surface of the soil particles and is strongly resistant to being washed out by passing effluent.

Figure 5:
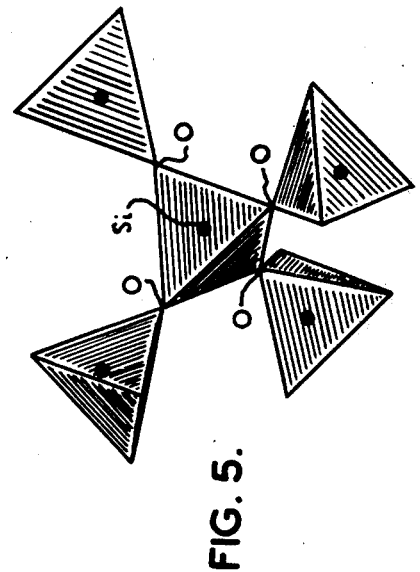
FIG. 5 is a schematic drawing of a soil particle crystal showing the silicon tetrahedron structure in which each silicon is surrounded by four oxygen ions.

While it is possible in some cases that red mud particles may be adhered mechanically to the soil, it is to be noted that single soil particles as shown schematically in FIG. 5, have reactive chemical groups and side valencies on their surface, both of which cause a bond with minumum size chemical additive particles without reducing permeability of soils treated with the additives.

Referring now particularly to the drawings, FIG. 1 shows a conventional leaching bed consisting of parallel rows 1 of perforated pipe or tile 2 fed by non-perforated headers fanning out from a distributing chamber 3. The rows 1 spaced about six feet apart and, depending on whether it is a gravity or dosed bed, may be from sixty to one hundred feet long with a uniform slope not exceeding four inches in one hundred feet. It is usual to lay the tile 2 in trenches 4 of suitable width and depth. In FIGS. 2 and 3 an embodiment of the present invention shows a trench just over thirty-six inches deep and from eighteen to thirty-six inches wide. In the bottom of the trench, there is a gravel base 5 to a depth of some two inches and overlying this is the special layer 6 of the mixture of red mud and soil for a depth of six inches. Next above is a six inch layer of sand 7 and then a gravel bed 8 of a depth of eleven or twelve inches in the upper half of which the tile 2 is buried and, above this gravel 8, backfill soil 9 brings the trench fill material to a top height just above the level of the surrounding field.

Figure 4:
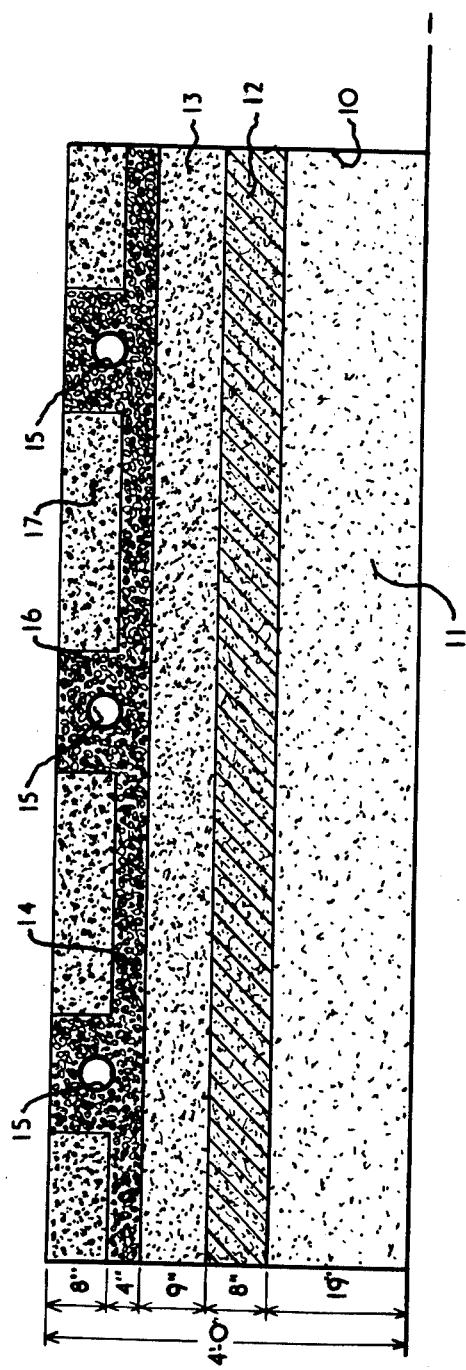
FIG. 4 is a transverse, vertical section of a modified arrangement of a filter and leaching bed for installation on soil or rock.

The modified filter and leaching bed arrangement illustrated in transverse vertical section in FIG. 4 is for installation on soil or rock: Here a suitably constructed bed 10 rises to a height of some four feet with a filter soil base 11 of a depth of nineteen inches and having a coefficient of permeability $> 10^{-5}$ cm/sec. Superposing this is an eight inch layer 12 of the special mixture of red mud and soil and then another nine inch layer of soil 13. Next is a four inch layer of gravel 14 on which spaced parallel rows of four perforated distributor pipes 15 are laid at four foot centers and buried in surrounding gravel 16 for the next eight inches in height and for some six inches on each side so that, in effect, the perforated pipes or tiles 15 are disposed centrally in a gravel body sixteen inches wide and twelve inches deep. Pea gravel 17 fills the eight inch deep troughs between the tile-surrounding gravel bodies 16.

The specific dimensions given herein resulted from a careful consideration of factors involved but are only examples and may be varied as required.

Throughout this described treatment of sewage effluent the role of the special filter mixture of red mud and soil has been emphasized for removing phosphate and promoting the breakdown of bacteria. Of critical importance to the effectiveness of this mixture is the wash-out resistance of the chemical additives. Like the soil particle crystal showing the silicon tetrahedron structure illustrated in FIG. 5, red mud also has tetrahedron structure. It is a sodalite type of material, occurring as waste from bauxite processing in micron size particles. Its tetrahedra have iron, aluminum, and silicon (Si) ions as centres, each being surrounded by 4 hydroxyl (OH—) ions.

Therefore, when red mud is mixed with sandy soil containing—as usual—small amounts of soil specimens similar to FIG. 5, the crystals of both substances absorb each other and form for instance hydrogen bonds between two adjacent hydroxyl groups, or exchange their cation with the ion of the red mud, or just grow together as mixed crystals. Thus they become attached to each other, and the red mud forms micron thick layers on the soil particles, which are not washed out and expose a maximum of their reactive surface to arrest the phosphate ions of the sewage effluent percolating through the mixed filter or leaching bed.

Red mud sludge and soil are mixed, on the basis of dry weight, in the range of approximately 0.1 part to approximately 25 parts of red mud sludge per 100 parts of soil but preferably in the range of approximately 2 parts to approximately 10 parts of red mud per 100 parts of soil.

EXAMPLE

Test installations and comparable laboratory reports:

A box 12'×10' and 4' deep was made up of plywood. The box was lined with a plastic membrane to collect all the treated effluent instead of allowing it to seep into the ground. On the bottom of the box were two lengths of 8'-10" perforated collector pipe, joined by a header and above and around these collector pipes to a height of 6" from the bottom, 1" to 1½" size crushed stone was placed in order that the treated effluent could be collected for analysis. This was followed by 13" of soil with effective size 0.24 mm, uniformity coefficient 3.9 and permeability coefficient $2.6 \times 10^{-2}$ cm/sec. In a cement mixer similar soil was mixed with red mud slurry to provide approximately 4% of red mud in the mixture. This mixture was put on top of the 13 inches sand as a layer 8 inches deep. On top of this was placed another nine inches of the soil similar to that above the ground. Above this was 4 inches of crushed stone on which rested the three perforated distribution pipes 8'-0" long with a header and connected to the sewage dosing tank. These distributors were surrounded by crushed stone. The box was then covered with top soil. Sewage effluent from septic tank at the loading rate of 1 gallon per square foot of filter area per day was discharged into the filter system. Crushed stone of the size indicated is a suitable and usually available aggregate.

Another filter system identical to the first with 30 inches of filter soil but without any red mud was installed to set as a control.

Both systems are operated simultaneously and the results of lab reports of 24 hour composite samples during initial 9 months of operation were analyzed statistically. The values for 85% of the samples for some of the parameters are given in the following table (Table 1) which compares the influent and effluent qualities for the bed with red mud, control bed and the septic tank.

TABLE 1

| | | Filter bed with red mud (output) | Filter bed without red mud (output) | Effluent from septic tank (input) |
|---|---|---|---|---|
| In 85% of the samples, the values were equal to or less than the following: | | | | |
| BOD | mg/l | 5.5 | 7.4 | 310 |
| Suspended Solids | mg/l | 3.9 | 3.6 | 153 |
| Free Ammonia | (N) mg/l | 1.7 | 2.3 | 37 |
| Total Phosphate | (PO$_4$) mg/l | 7.3 | 36.5 | 66 |
| Total Coliform/100ml | | 8,000 | 60,000 | $42 \times 10^6$ |
| Fecal Coliform/100ml | | 4,200 | 18,000 | $6 \times 10^6$ |

The term SOIL has been used throughout in a generic sense and includes sand, and mixtures with some silt, clay or slag and like particles. The effective size of such soil may vary but preferably includes some particles of very small size providing a large surface area exposed to the effluent and/or to which chemical additives can adhere. The permeability coefficient (K) should fall within the range of 1 cm/sec to $10^{-5}$ cm/sec.

The foregoing description is presented for the purpose of illustration only and is not to be regarded as restricting in any way the scope of the invention as defined in the appended claims.

I claim as my invention:

1. A method of treating sewage effluent containing phosphate in a leaching bed having a distribution system comprising the following steps:
   (a) admixing red mud as derived from processing bauxite with soil having a permeability coefficient (K) of not less than $10^{-5}$ cm/sec;
   (b) applying a layer of such mixture in the leaching bed below the distribution system and,
   (c) percolating the sewage effluent in the presence of entrained air through such layer of red mud and soil mixture to remove phosphate from the effluent and retain the phosphate.

2. The sewage treatment method according to claim 1, wherein the red mud is able to form tetrahedral structures.

3. A method of treating sewage effluent containing phosphate in a leaching bed having a distribution system comprising the following steps:
   (a) admixing red mud as derived from processing bauxite with soil having a permeability coefficient (K) of not less than $10^{-5}$ cm/sec;
   (b) applying a layer of such mixture in the leaching bed below the distribution system and,
   (c) percolating the sewage effluent in the presence of entrained air through such layer of red mud and soil mixture to remove phosphate from the effluent and retain the phosphate; and wherein the red mud particles are of a very small size causing the same to adhere to the soil in washout resisting relation.

4. The method according to claim 3 wherein the very small size of the red mud particles provide a large reactive area exposed to the effluent.

5. The method of claim 3 wherein the particles of the red mud promote the breakdown of coliform bacteria in the sewage effluent by reacting in the presence of oxygen entrained in the system.

* * * * *